United States Patent
Suzuki et al.

(10) Patent No.: US 6,636,323 B2
(45) Date of Patent: *Oct. 21, 2003

(54) IMAGE FORMING APPARATUS FOR FORMING IMAGE IN COPY MODE AND MODE OTHER THAN COPY MODE

(75) Inventors: Yoshihiko Suzuki, Toride; Akiyoshi Kimura, Kawasaki; Yoshiyuki Suzuki, Yokohama; Tadashi Suzuki, Tokyo; Shinichi Nakamura; Minoru Nada, both of Kawasaki; Satoru Kutsuwada, Yokohama; Kenji Kobayashi, Tokyo; Satoshi Kaneko; Shokyo Koh, both of Kawasaki; Norifumi Miyake, Tokyo; Hirohiko Tashiro, Yokohama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/670,439

(22) Filed: Jun. 26, 1996

(65) Prior Publication Data

US 2002/0057445 A1 May 16, 2002

(30) Foreign Application Priority Data

Jun. 27, 1995 (JP) ............................................. 7-160991

(51) Int. Cl.⁷ ............................. H04N 1/00; G06F 7/00
(52) U.S. Cl. ...................... 358/1.13; 358/403; 358/468; 399/405
(58) Field of Search ................................. 395/112, 114; 358/448, 296, 400, 403, 468; 271/298, 288, 293; 399/82, 85, 397, 407, 400, 402, 403, 404, 405

(56) References Cited

U.S. PATENT DOCUMENTS

| | | | | |
|---|---|---|---|---|
| 4,598,323 A | | 7/1986 | Honjo et al. | 358/285 |
| 4,675,745 A | | 6/1987 | Suzuki | 358/285 |
| 4,696,466 A | * | 9/1987 | Yamasaki et al. | 271/288 |
| 4,843,434 A | * | 6/1989 | Lawrence et al. | 355/72 |
| 5,166,739 A | * | 11/1992 | Katsuki et al. | 399/401 |
| 5,342,034 A | * | 8/1994 | Mandel et al. | 270/58.08 |
| 5,358,238 A | * | 10/1994 | Mandel et al. | 271/298 |
| 5,435,544 A | * | 7/1995 | Mandel | 271/298 |
| 5,437,444 A | | 8/1995 | Kawakami et al. | 271/22 |
| 5,535,012 A | * | 7/1996 | Matsumoto et al. | 358/400 |
| 5,547,178 A | * | 8/1996 | Costello | 270/52.02 |
| 5,580,045 A | * | 12/1996 | Matsumoto et al. | 271/298 |
| 5,610,724 A | * | 3/1997 | Kaneko et al. | 358/400 |
| 5,729,791 A | * | 3/1998 | Kutsuwada et al. | 399/82 |
| 5,742,890 A | * | 4/1998 | Kato et al. | 399/403 |
| 5,822,075 A | * | 10/1998 | Kaneko et al. | 358/296 |
| 5,982,994 A | * | 11/1999 | Mori et al. | 358/1.15 |

* cited by examiner

*Primary Examiner*—Edward Coles
*Assistant Examiner*—Joseph R. Pokrzywa
(74) *Attorney, Agent, or Firm*—Fitzpatrick, Cella, Harper & Scinto

(57) ABSTRACT

An image forming apparatus includes an image forming unit for forming images on sheets in the copy mode, the facsimile mode, and the printer mode a plurality of storage units for storing the sheets on which images are formed by the image forming unit, a setting unit for setting storage units which are to store sheets on which images are formed in the respective modes, a detection unit for detecting empty states of the storage units, and a control unit for storing sheets on which images are formed in the facsimile or printer mode in the storage units that are set by the setting unit, and storing sheets on which images are formed in the copy mode in storage units whose empty states are detected by the detection unit independently of the setting state of the setting unit.

33 Claims, 15 Drawing Sheets

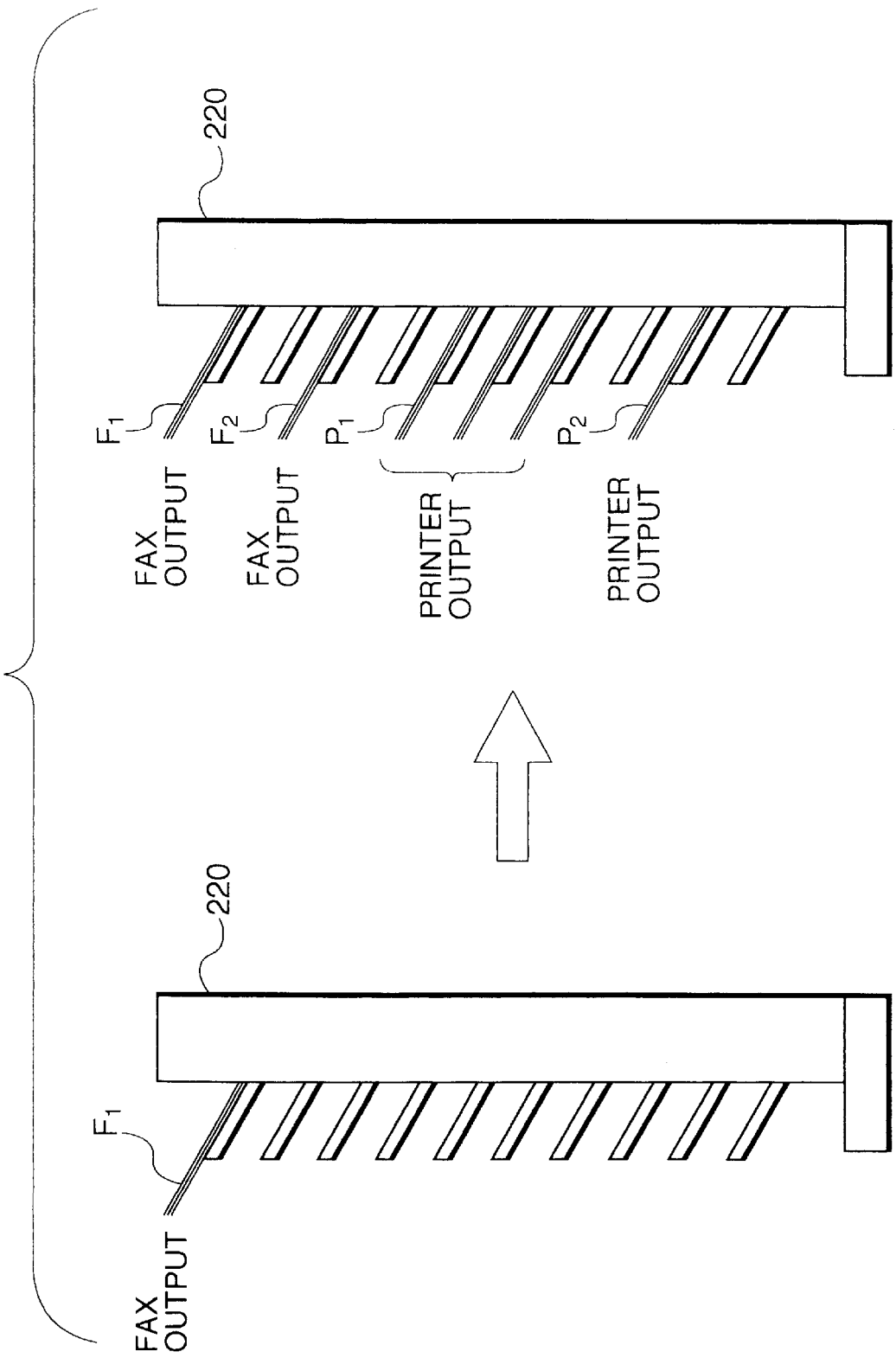

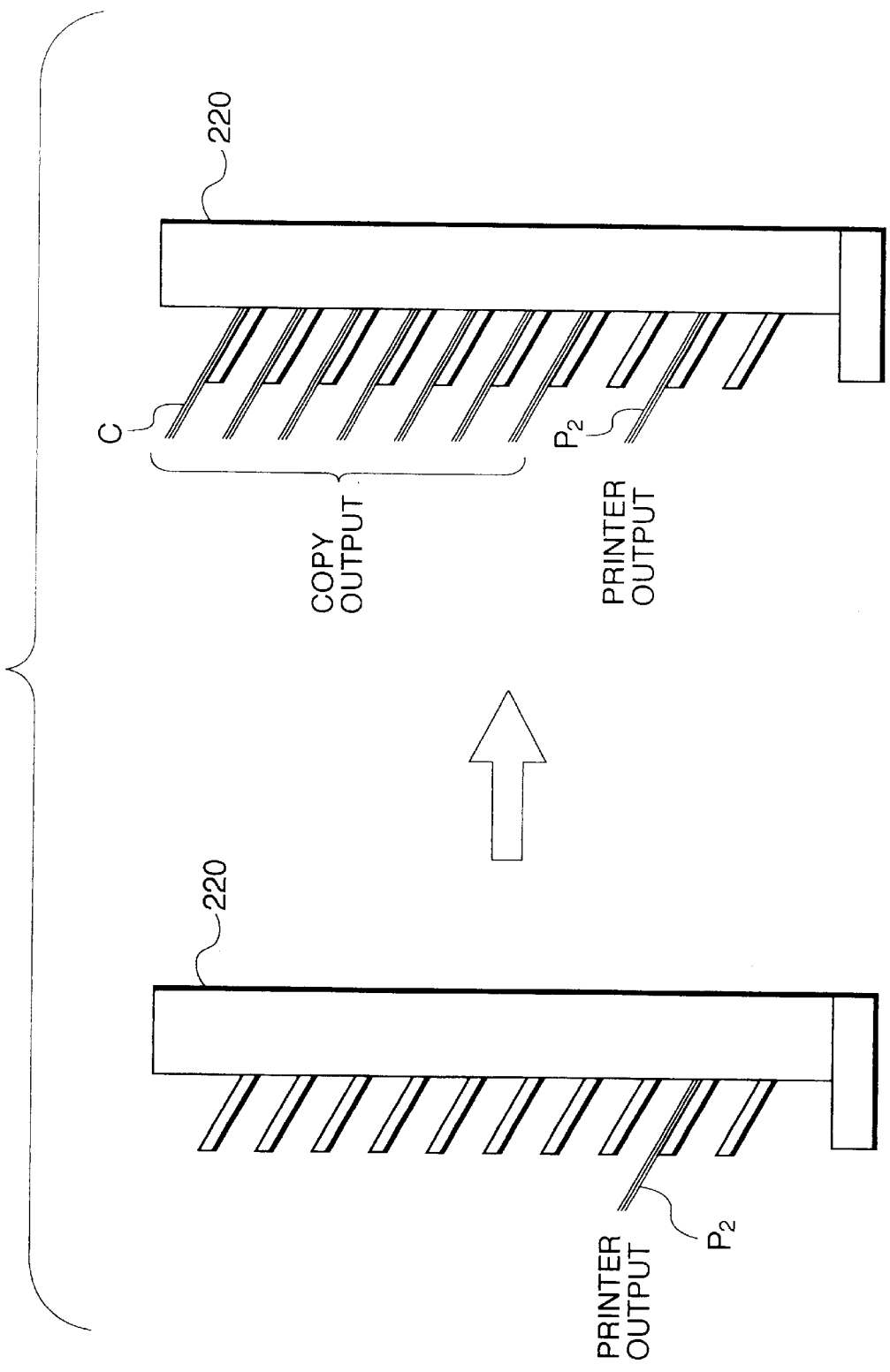

IMAGE FORMING APPARATUS FOR FORMING IMAGE IN COPY MODE AND MODE OTHER THAN COPY MODE

BACKGROUND OF THE INVENTION

1. Field of the Invention

The present invention relates to an image forming apparatus for forming images on sheets in the copy mode and a mode (the facsimile mode, printer mode, or the like) other than the copy mode, and sorting the sheets in units of modes.

2. Related Background Art

A conventional image forming apparatus that can execute a plurality of modes such as the copy mode, the facsimile mode, the printer mode, and the like is arranged to sort sheets on which images are formed in the respective modes using bins of a sorter in units of modes.

However, the respective bins are permanently assigned to the respective modes. For example, when an operator wants to form seven sets of copies in the copy mode, if five bins are assigned to the copy mode, seven sets of copies cannot be formed even when the bins for the facsimile and printer modes are not currently used and available.

SUMMARY OF THE INVENTION

It is an object of the present invention to provide an image forming apparatus which can solve the above-mentioned problem.

It is another object of the present invention to provide an image forming apparatus which can effectively use a plurality of storage means for storing sheets, and does not disturb the storage operations of sheets in different modes.

Other objects and features of the present invention will become apparent from the following specification and the accompanying drawings.

BRIEF DESCRIPTION OF THE DRAWINGS

FIG. 16 is a side view showing the state of ejected paper sheets of the third embodiment; and FIG. 17 is a side view showing the state of ejected paper sheets of the second embodiment.

DETAILED DESCRIPTION OF THE PREFERRED EMBODIMENTS

First Embodiment

Figure 1:
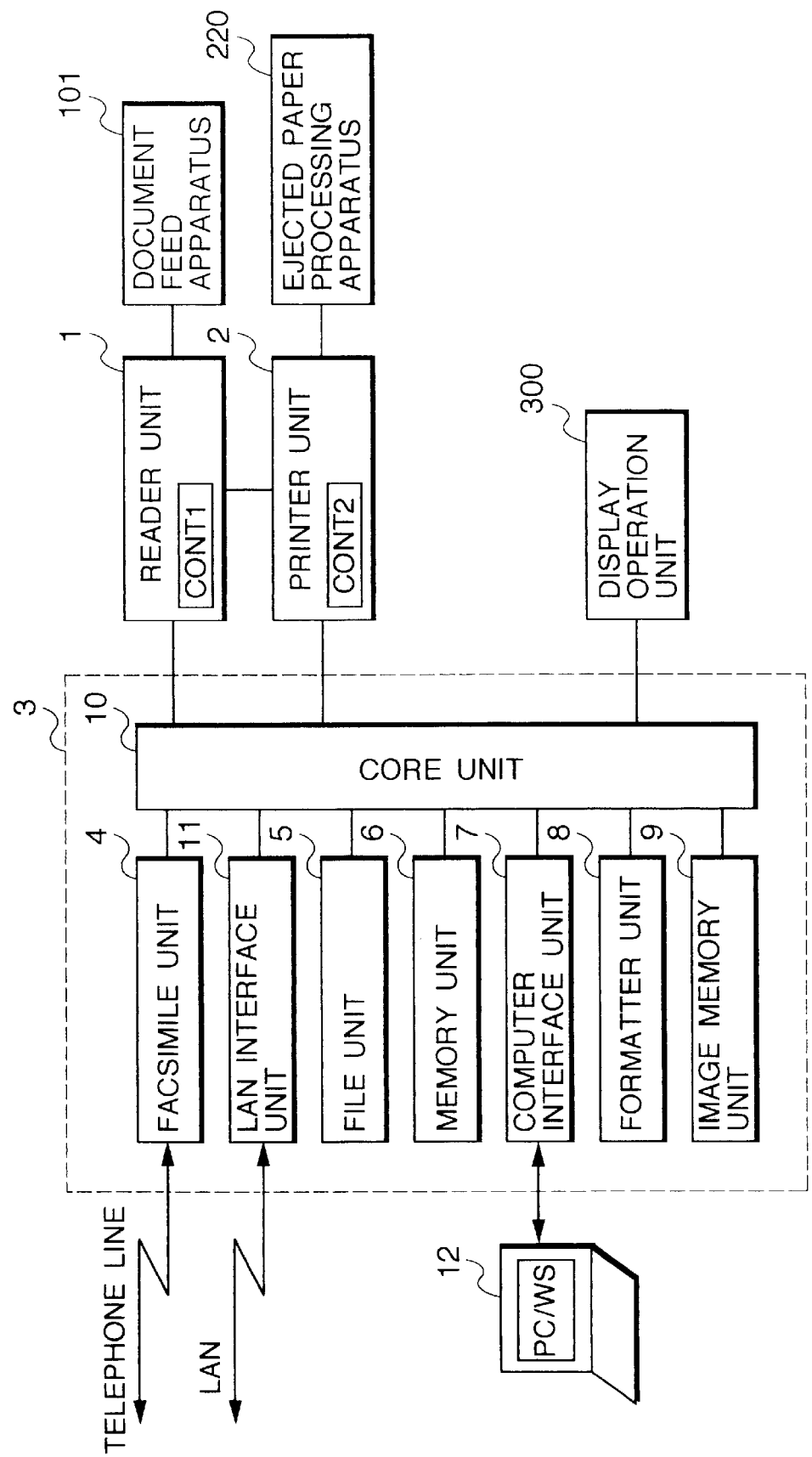
FIG. 1 is a block diagram showing the overall arrangement of an image forming apparatus.

FIG. 1 is a block diagram showing the arrangement of an image forming apparatus according to the first embodiment of the present invention.

Referring to FIG. 1, an image input device (to be referred to as a reader unit hereinafter) 1 converts an original image into image data. An image output device (to be referred to as a printer unit hereinafter) 2 has a plurality of different recording paper cassettes, and outputs image data onto a recording paper sheet as a visible image in accordance with a print command. An external apparatus 3 is electrically connected to the reader unit 1, and has various functions.

More specifically, the external apparatus 3 comprises a facsimile unit 4, a file unit 5, a memory unit 6, a computer interface unit 7 for connecting a computer 12, a formatter unit 8 for converting code information from the computer into a visible image, an image memory unit 9 for storing information from the reader unit 1 and temporarily storing information sent from the computer, a LAN interface unit 11 for connecting a LAN, a core unit 10 for controlling the above-mentioned functions, and the like. The reader unit 1 includes a reader controller CONT1, and the printer unit 2 includes a printer controller CONT2.

Figure 2:
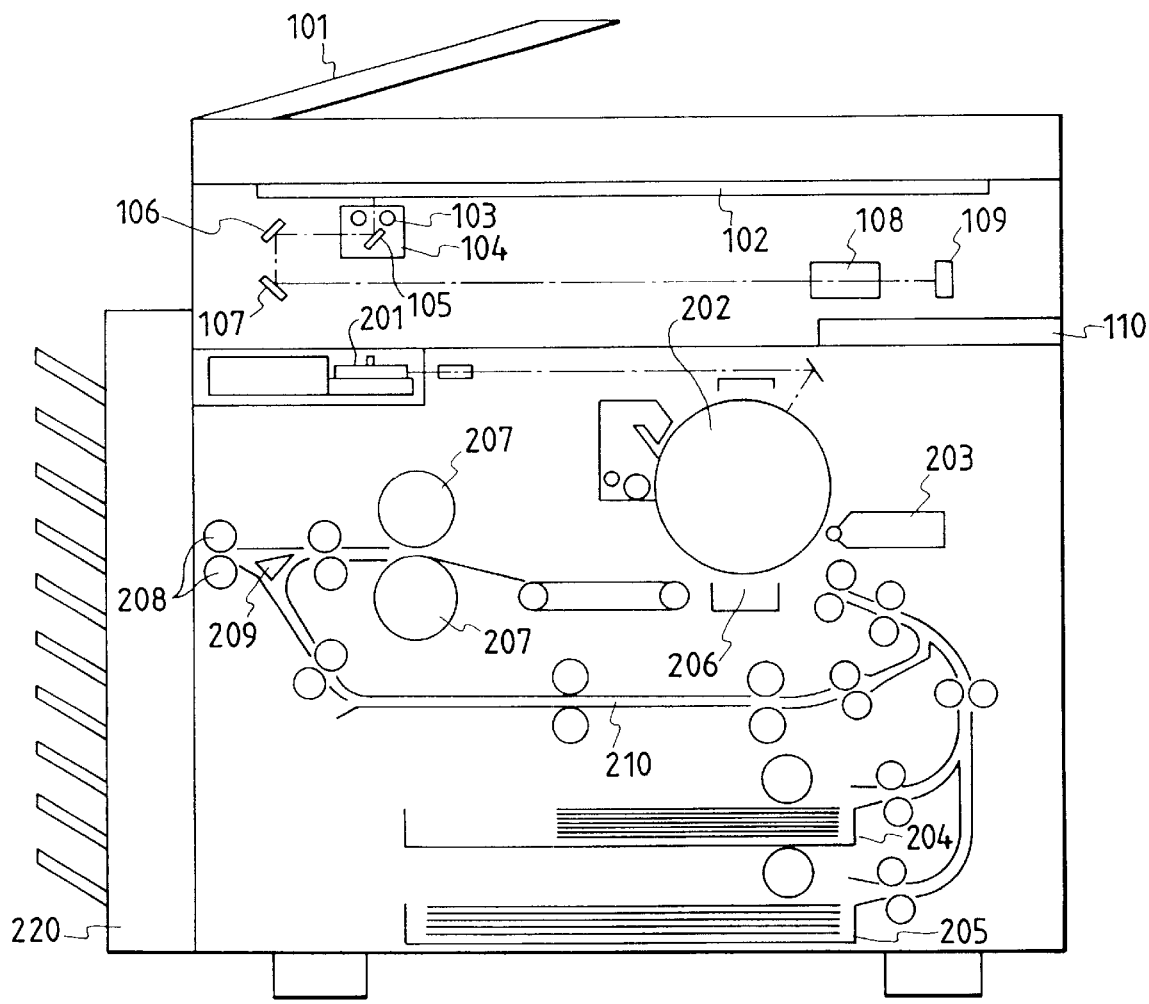
FIG. 2 is a sectional view showing the arrangement of a reader unit and a printer unit shown in FIG. 1.

FIG. 2 is a sectional view showing the arrangement of the reader unit 1 and the printer unit 2. The arrangement and operation of these units will be described below.

Originals stacked on a document feeder 101 are sequentially conveyed onto a document table glass surface 102 one by one. When an original is conveyed to the predetermined position on the glass surface 102, a lamp unit 103 of a scanner unit 104 is turned on, and the scanner unit 104 moves to illuminate the original with light emitted by the lamp unit 103. Light reflected by the original is input to a CCD image sensor unit 109 (to be referred to as a CCD hereinafter) via mirrors 105, 106, and 107, and a lens 108.

The light reflected by the original and irradiated onto the CCD 109 is photoelectrically converted by the CCD 109. The converted electrical signal is subjected to various kinds of image processing by an image processing unit 110, and the processed signal is supplied to an external switching circuit.

The external switching circuit serves as a selector for selecting the output destination of a signal output from the reader unit 1 from one of the printer unit 2 and the external apparatus 3. Also, the external switching circuit selects one of a signal from the reader unit 1 and a signal from the external apparatus 3, and connects the selected signal to the printer unit 2.

The electrical signal connected to the printer unit 2 by the external switching circuit of the image processing unit 110 is converted into a modulated optical signal by an exposure control unit 201, and the optical signal is irradiated onto a photosensitive body 202. A latent image formed on the photosensitive body 202 by the irradiated light is developed by a developer 203. A transfer sheet is conveyed from a transfer sheet stacking unit 204 or 205 in synchronism with the timing of the leading end of the developed image, and the developed image is transferred onto the sheet by a transfer unit 206. The transferred image is fixed onto the transfer sheet by a fixing unit 207, and the sheet is ejected from an ejection unit 208 to a portion outside the printer unit. When the sort function of an ejected paper processing apparatus 220 is enabled, transfer sheets ejected from the ejection unit 208 are ejected onto bins; when the sort function is disabled, transfer sheets are normally ejected onto the uppermost bin of the ejected paper processing apparatus 220 but may be ejected onto a bin designated by a setting operation. The respective bins of the ejected paper processing apparatus 220 have bin sensors, which can detect the presence/absence of ejected paper sheets.

A method of outputting sequentially read images onto the two surfaces of a single paper sheet will be explained below.

After an output paper sheet subjected to the fixing operation in the fixing unit 207 is temporarily conveyed to the ejection unit 208, the convey direction of the paper sheet is reversed, and the output paper sheet is then conveyed to a re-feed transfer sheet stacking unit 210 via a convey direction switching member 209. When the next original is prepared, an original is read in the same manner as in the above-mentioned process. In this case, since the transfer sheet is fed from the re-feed transfer sheet stacking unit 210, two original images can be consequently formed on the front and rear surfaces of a single paper sheet.

As shown in FIG. 1, the external apparatus 3 is connected to the reader unit 1 via a cable, and the core unit 10 in the external apparatus 3 controls signals and various functions. The external apparatus 3 comprises the facsimile unit 4 for performing facsimile transmission and reception, the file unit 5 for converting various kinds of original information into electrical signals and saving the signals in a magneto-optical disk, the formatter unit 8 for developing code information sent from the computer 12 to image information, the computer interface unit 7 for interfacing with the computer, the image memory unit 9 for storing information from the reader unit 1 and temporarily storing information sent from the computer, the LAN interface unit 11 for interfacing with a LAN, and the core unit 10 for controlling the above-mentioned functions.

Figure 3:
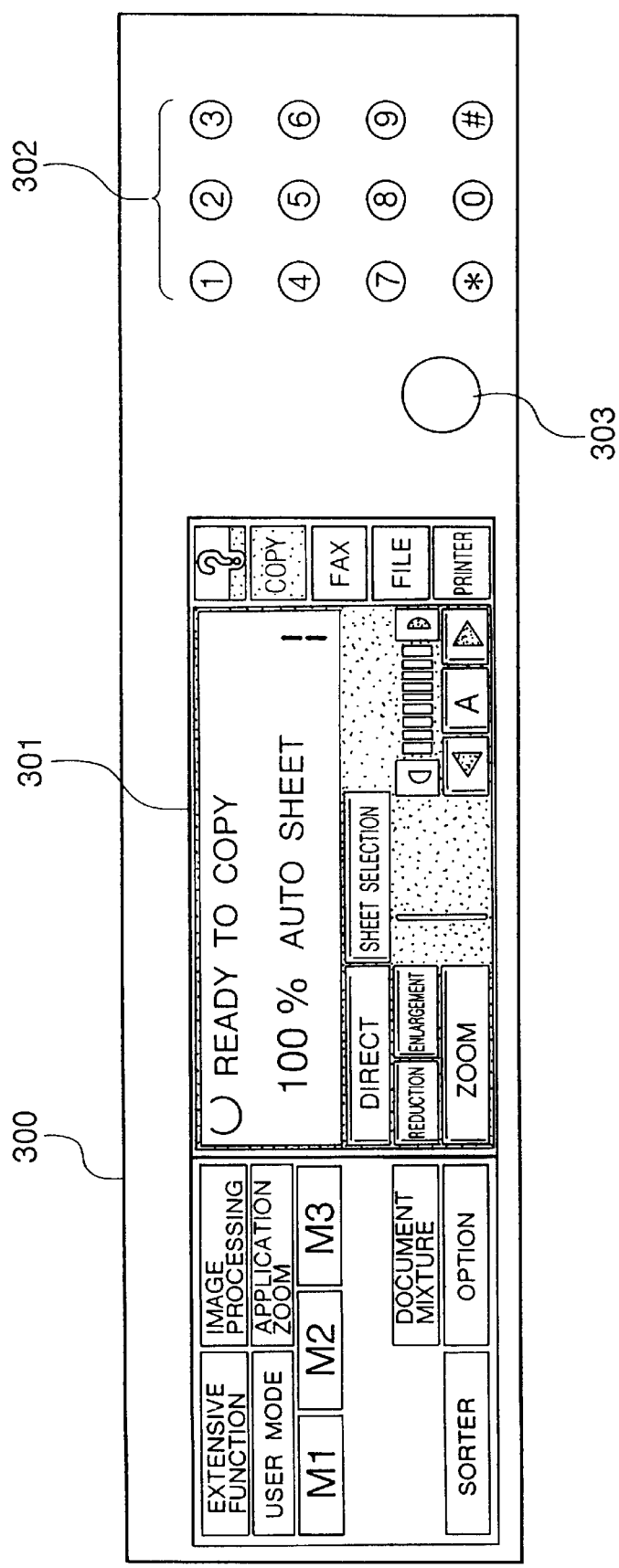
FIG. 3 is a plan view of an operation panel of the reader unit shown in FIG. 1.

FIG. 3 is a plan view showing the arrangement of a display operation unit 300 (FIG. 1) connected to the core unit 10. Referring to FIG. 3, a display unit 301 displays an operation state and a message. The surface of the display unit 301 is constituted by a touch panel, and serves as a selection key when an operator touches the surface. A ten-key pad 302 includes numeral input keys. A start key 303 is used for starting an operation when it is depressed.

The operation will be explained below with reference to the flow charts in FIGS. 4 to 9.

Figure 4:
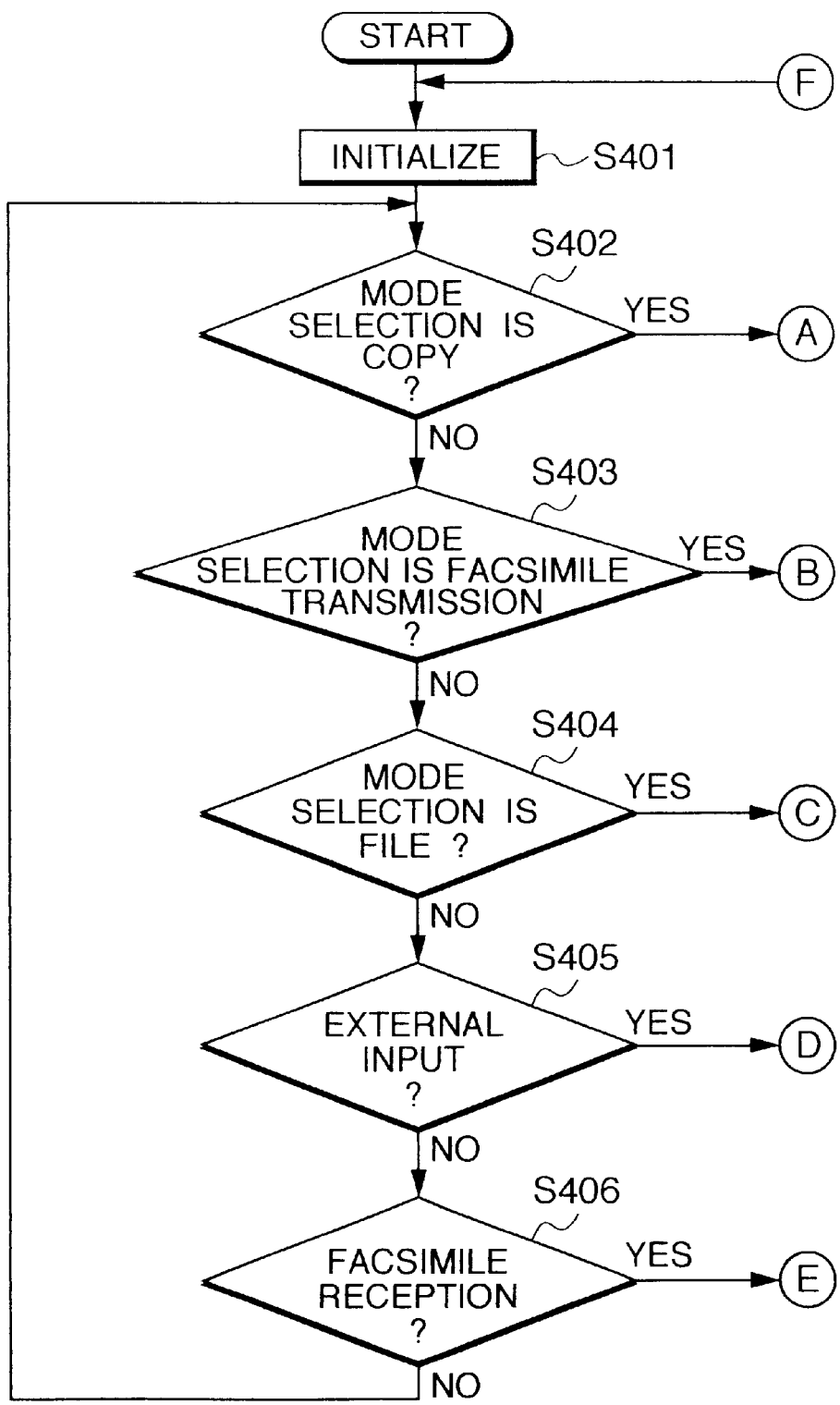
FIG. 4 is a flow chart showing the overall operation according to the first embodiment of the present invention.

Referring to FIG. 4, after the power switch is turned on, initialization is performed (S401). Operation mode selection keys are displayed on the display unit 301 of the operation panel, and when the operator touches the panel portion on one of the selection keys, a mode is selected.

It is checked if the selected mode is the copy mode (S402). If Y (YES) in step S402, the flow advances to step A. On the other hand, if N (NO) in step S402, it is checked if the selected mode is the facsimile transmission mode (S403). If Y in step S403, the flow advances to step B. However, if N in step S403, it is checked if the selected mode is the file mode (S404). If Y in step S404, the flow advances to step C. If N in step S404, it is checked if the selected mode is the input mode using the computer interface (S405). If Y in step S405, the flow advances to step D.

However, if N in step S405, it is checked if the selected mode is the facsimile reception mode (S406). If Y in step S406, the flow advances to step E. If N in step S406, the flow returns to step S402 to check if the selected mode is the copy mode. Thereafter, the above-mentioned selected mode discrimination steps S402 to S406 are repeated.

Figure 5:
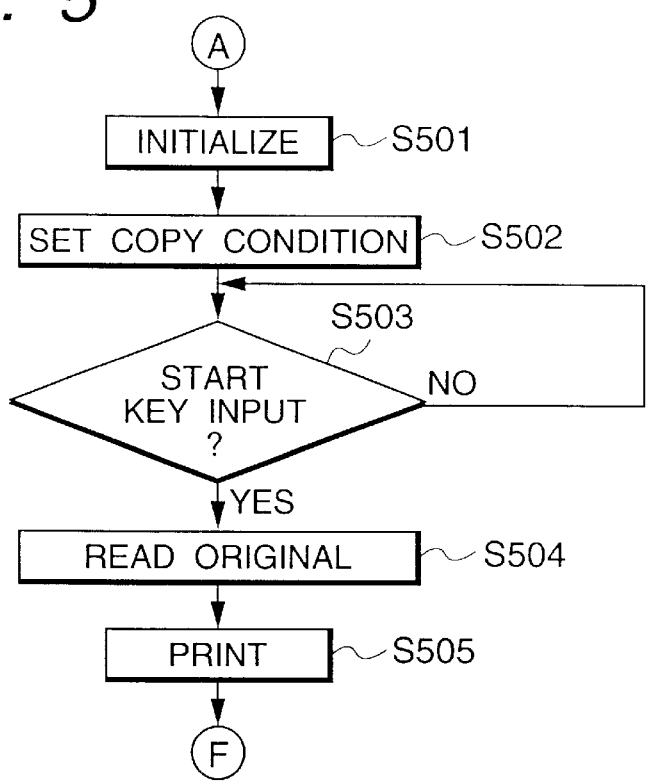
FIG. 5 is a flow chart showing the copy operation according of the first embodiment.

FIG. 5 is a flow chart showing the operation when the copy mode is selected.

The initialization for a copy operation is performed (S501), and a desired copy condition is set by reading keys input using the display unit 301 and the ten-key pad 302 from the operation panel (S502). Then, the control waits for input of the start key 303 (S503). When the start key is depressed, an original image is read by the reader unit 1 (S504), and the read image is printed by the printer unit 2 (S505). The detailed operation of this mode has already been described above with reference to FIG. 2. Upon completion of the print operation, the control returns to the initialization step (S401).

Figure 6:
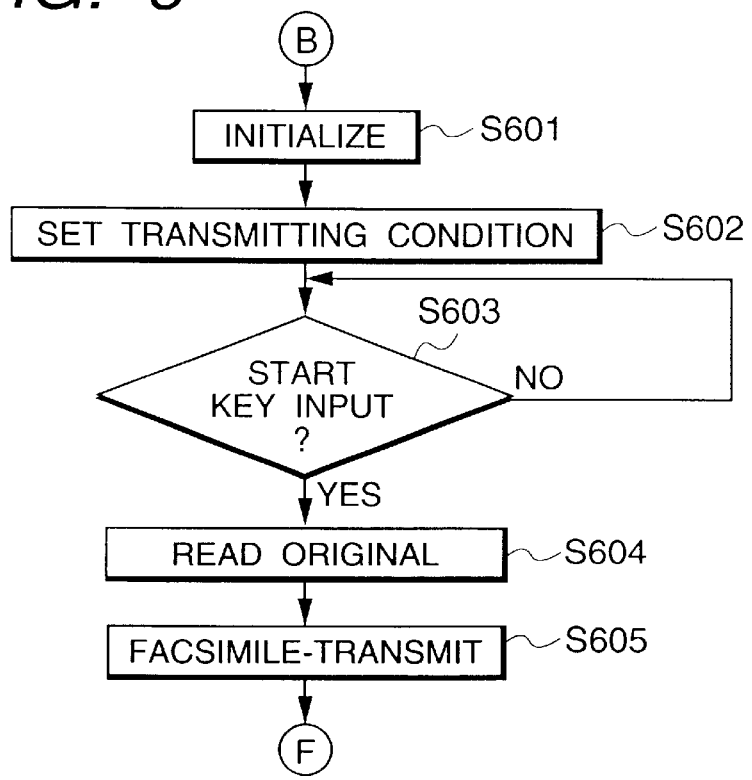
FIG. 6 is a flow chart showing the operation in the facsimile transmission mode of the first embodiment.

FIG. 6 is a flow chart showing the operation when the facsimile transmission mode is selected.

The initialization of the facsimile transmission operation is performed (S601), and a desired facsimile transmitting condition is set by reading keys input using the display unit 301 and the ten-key pad 302 from the operation panel (S602). Then, the control waits for input of the start key 303 (S603). When the start key is depressed, an original image is read by the reader unit 1 (S604), and image data is sent to the facsimile unit 4. The facsimile unit 4 performs facsimile transmission in accordance with a set format and a predetermined protocol (S605). Upon completion of transmission, the control returns to the initialization step (S401) in FIG. 4.

Figure 7:
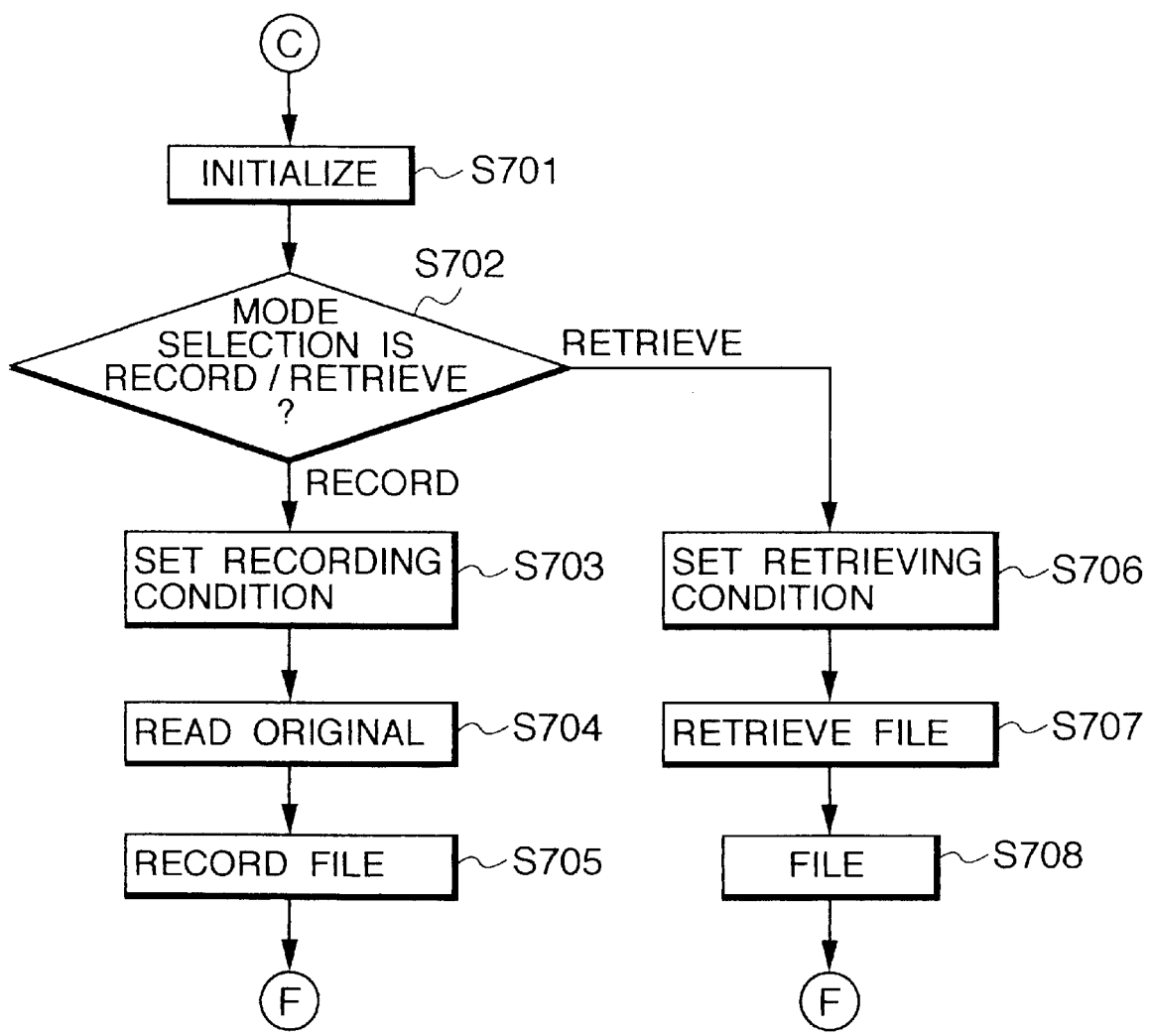
FIG. 7 is a flow chart showing the operation in the file recording or retrieving mode of the first embodiment.

FIG. 7 is a flow chart showing the operation when the file mode is selected.

The initialization for a file operation is performed (S701), and file recording and retrieving mode selection keys are displayed on the operation panel (S702) to wait for a key input. When the recording key is selected, a desired recording condition is set (S703), and an original image is read by the reader unit 1 (S704). The read data is supplied to the file unit 5, and the file unit 5 records the data in the memory unit 6 (S705). On the other hand, if the file retrieving mode is selected in step S702, a retrieving condition is set (S706), and a file is retrieved from the memory unit 6 (S707). Then, the retrieving result is output (S708). Upon completion of recording or retrieving, the control returns to the initialization step (S401).

Figure 8:
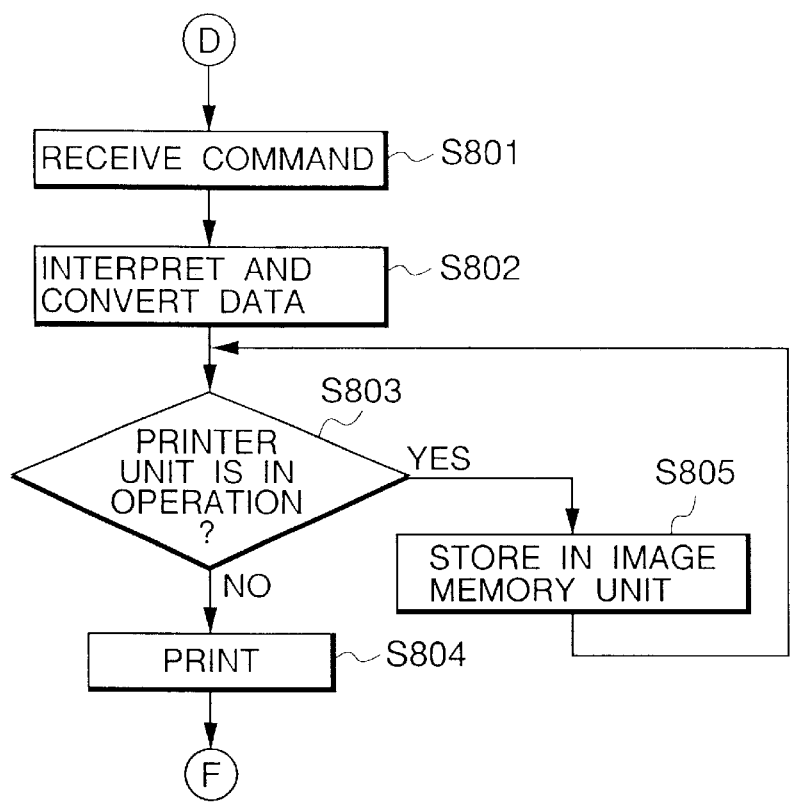
FIG. 8 is a flow chart showing the print operation when print command data is input via an external interface in the first embodiment.

FIG. 8 is a flow chart showing the operation when command data is externally input to the computer interface unit.

A command is received by the computer interface unit (S801), and data is sent to the formatter unit 8 via the core unit 10. The formatter unit 8 interprets the data and converts it into significant information such as character data (S802). Then, information is output. In this case, it is checked if the printer unit 2 is in operation (S803). If N in step S803, the data is printed (S804). On the other hand, if Y in step S803, the data is stored in the image memory unit 9 (S805), and is printed when the printer is not in operation (S803, S804).

After the data is output, the control returns to the initialization step (S401).

Figure 9:
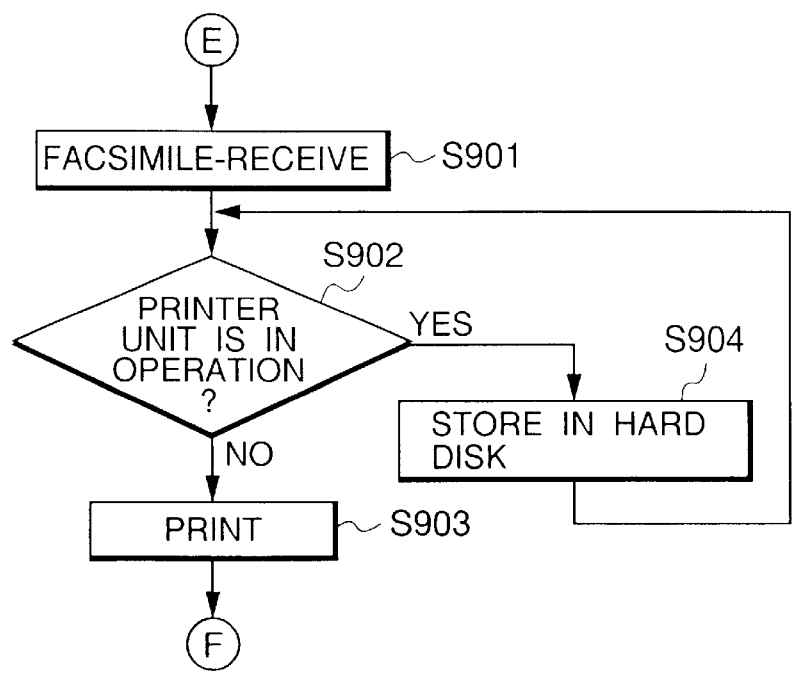
FIG. 9 is a flow chart showing the operation in the facsimile reception mode of the first embodiment.

FIG. 9 is a flow chart showing the operation when facsimile reception is performed.

The facsimile unit 4 performs facsimile reception (S901), and it is checked if the printer unit 2 is in operation (S902). If N in step S902, the received data is sent to the printer unit 2 and is printed (S903). However, if Y in step S902, the received data is stored in a hard disk of the facsimile unit 4 (S904), and is printed when the printer unit 2 is not in operation (S902, S903). After the data is printed, the control returns to the initialization step (S401).

The above operation is performed by selecting one of the above-mentioned modes using the selection key on the display unit 301 of the operation panel, by receiving data by the facsimile unit 4, or by detecting an external command by the computer interface unit 7.

Note that some of these operations may be performed in combination, or some other of these operations may be simultaneously and independently performed. In this case, the priority order of the operations is controlled by the core unit 10.

Figure 10:
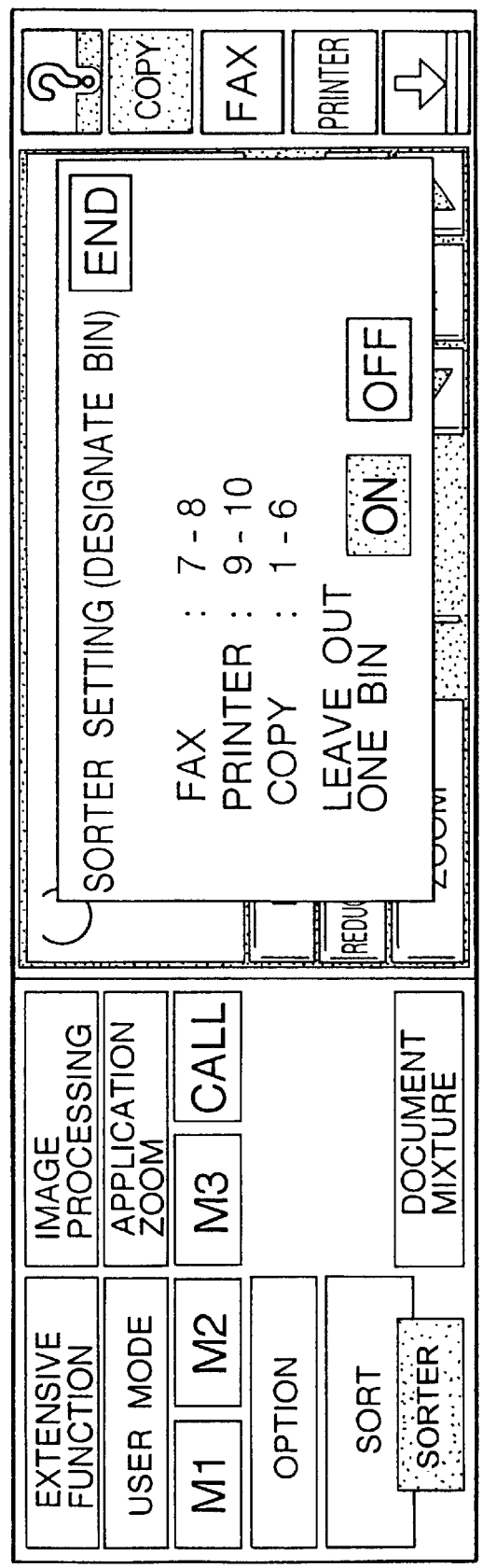
FIG. 10 is a plan view showing the setting screen of an ejected paper processing apparatus of the first embodiment.

FIG. 10 shows the setting screen with which the ejected paper processing apparatus (sorter) 220 (FIG. 1) is set in units of functions. With this screen, the 7th and 8th bins are used for facsimile (FAX) outputs, the 9th and 10th bins are set for printer outputs, and the 1st to 6th bins are set to be used for copy outputs. An item "leave out one bin" indicates a function of outputting data by leaving out one bin between the output bins of the respective functions, and in this case, this function is set in the ON state. In this embodiment, the core unit 10 controls the operation of the ejected paper processing apparatus 220 on the basis of the contents set on the operation unit 300 via the reader unit 1 and the printer unit 2.

Figure 11:
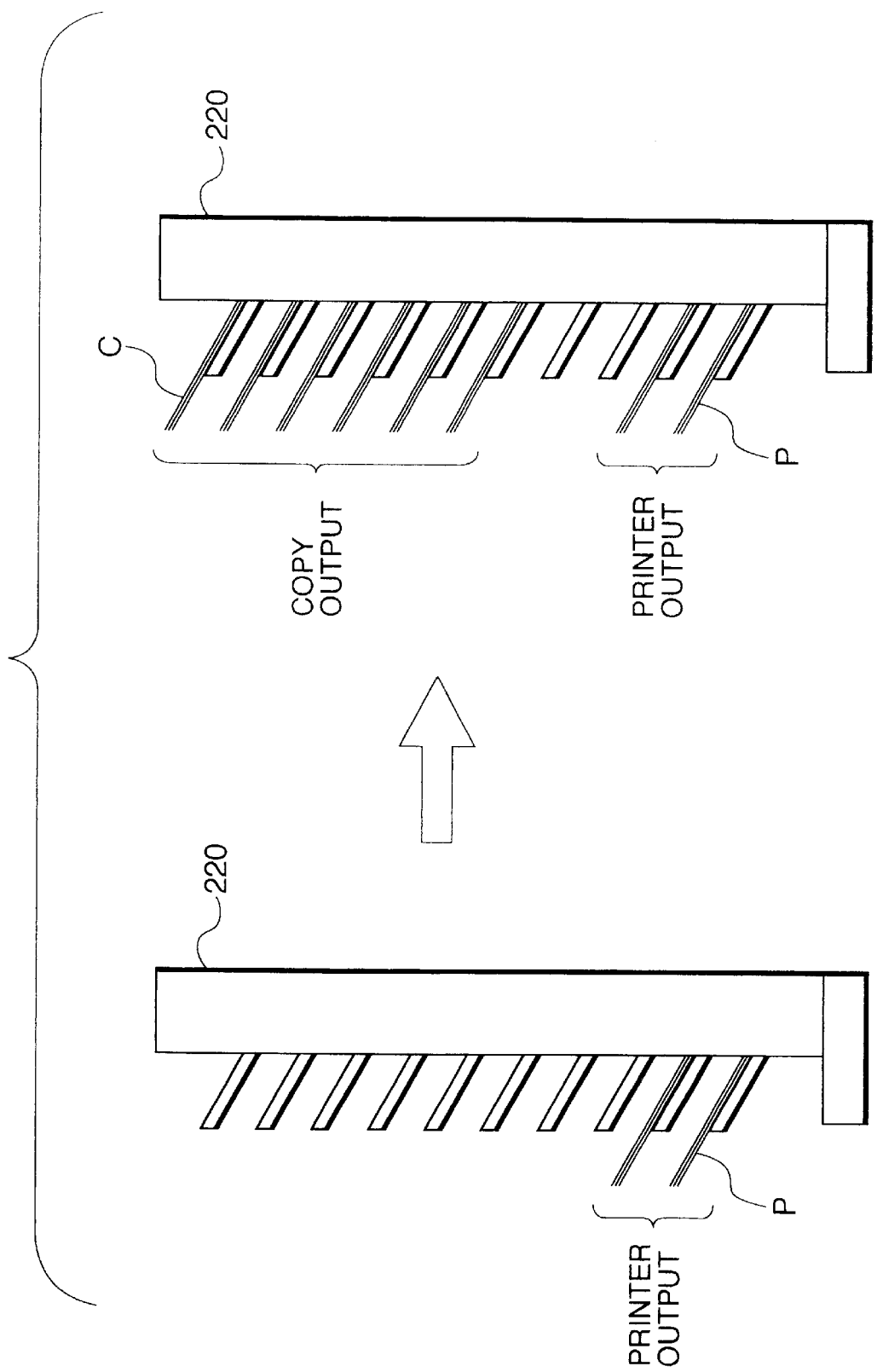
FIG. 11 is a side view showing the state of ejected paper sheets of the first embodiment.

FIG. 11 shows the actual output state of ejected paper sheets on the ejected paper processing apparatus 220. In the left drawing of FIG. 11, printer outputs P are ejected onto the 9th and 10th bins. The right drawing of FIG. 11 illustrates a state wherein a copy operation is started from the state of the left drawing in the sort mode. In this case, since copy outputs can be ejected onto the 1st to 6th bins, six bins are available. At the beginning of the copy operation, the number of available bins is calculated, and when the copy user sets seven or more sets of copies in the sort mode, a message indicating that the number of sets of copies is limited to six is displayed. On the other hand, if the document feeder 101 (FIG. 1) has a document circulation function, the setting operation of seven or more sets of copies is accepted, and a so-called limit-less sort operation for repeating a copy operation having six sets of copies as one unit is performed, thus allowing copying operations up to the maximum number of sets of copies (e.g., 999 sets) that can be set by the machine.

Figure 12:
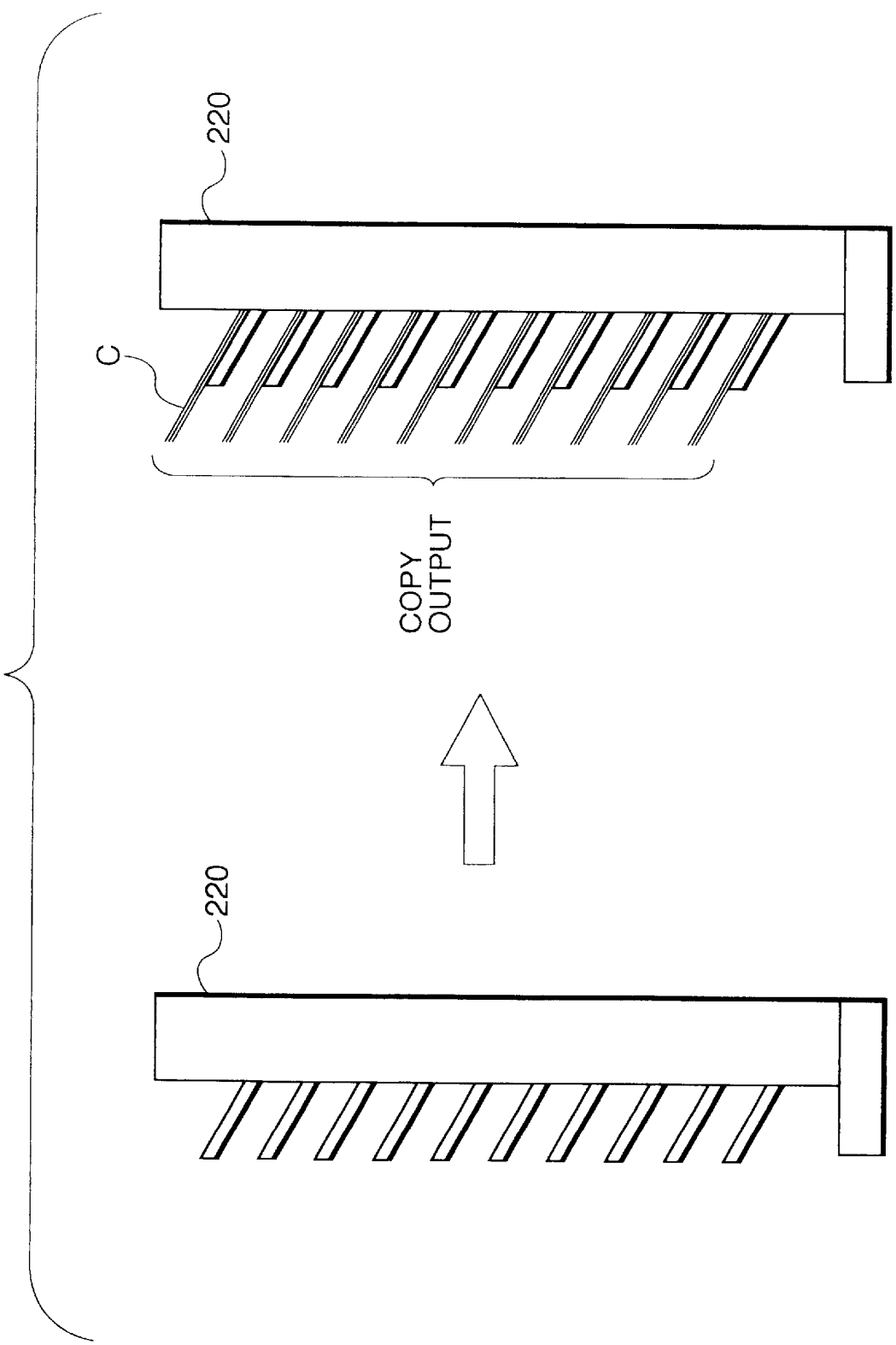
FIG. 12 is a side view showing the state of ejected paper sheets of the first embodiment.

The left drawing of FIG. 12 illustrates a state wherein all the outputs are removed from the ejected paper processing apparatus. The right drawing of FIG. 12 illustrates a state as a result of a copy operation in the sort mode from the state shown in the left drawing. In this case, six bins, i.e., the 1st to 6th bins are set for copy outputs. However, in the case of the copy operation, since the user operates the apparatus in front of it, and can remove copied sheets immediately after the copy operation, if all the bins of the ejected paper processing apparatus are available, the setting state can be temporarily and automatically changed so that all the 10 bins, i.e., the 1st to 10th bins, can be used. After copied sheets are removed, the previous setting state is resumed.

In this embodiment, the bins of the respective trays of the ejected paper processing apparatus have bin sensors, which detect the presence/absence of paper sheets. In place of the bin sensors, a through sensor which extends through all the bins and detects the presence/absence of paper sheets may be used to assure the same operation by managing the output bin positions.

As described above, when the setting state is automatically changed so that the maximum number of bins available at that time can be designated, operability can be greatly improved.

Second Embodiment

Figure 13:
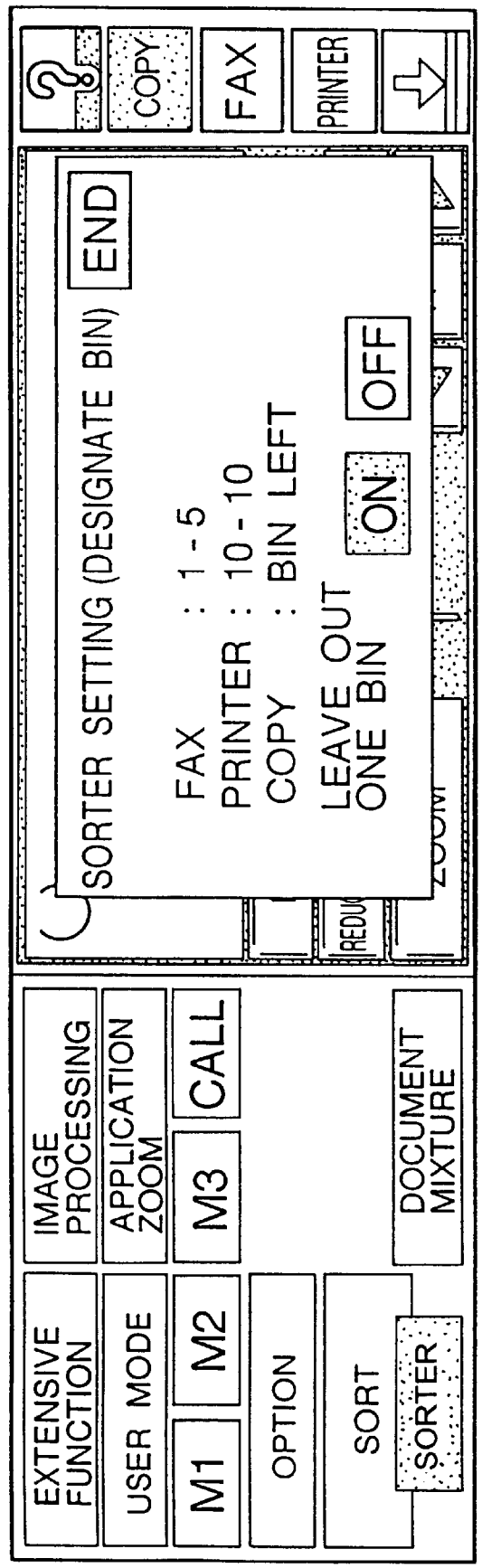
FIG. 13 is a plan view showing the setting screen of an ejected paper processing apparatus according to the second embodiment of the present invention.
Figure 14:
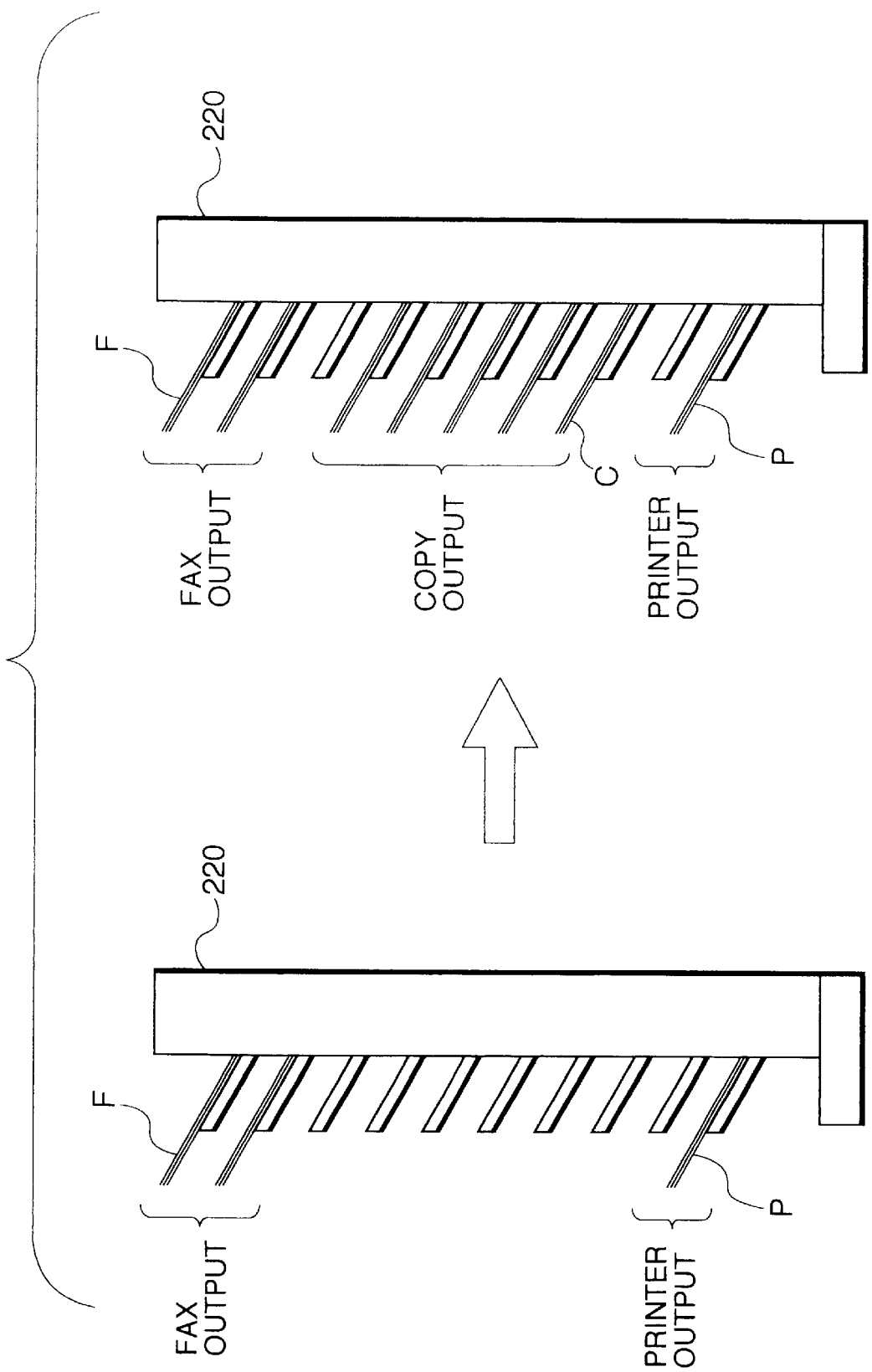
FIG. 14 is a side view showing the state of ejected paper sheets of the second embodiment.

FIGS. 13 and 14 show the second embodiment of the present invention. The arrangements other than those shown in FIGS. 13 and 14 are the same as those in the first embodiment, and a detailed description thereof will be omitted.

FIG. 13 shows the setting screen with which the setting operation of the ejected paper processing apparatus of this embodiment is performed in units of functions. In this setting state, the 1st to 5th bins are used for outputting facsimile data, the 10th bin is used for outputting printer data, and copy outputs use bins which are available at the time of the copy operation. An item "leave out one bin" indicates a function of outputting data by leaving out one bin between the output bins of the respective functions, and in this case, this function is set in the ON state.

In this embodiment as well, the setting state of the bins is temporarily and automatically changed, so that copy outputs use bins for other functions as well as long as such bins are available. After copied sheets are removed, the original setting state is resumed.

FIG. 14 illustrates the actual output state of the ejected paper processing apparatus 220 in the above-mentioned setting state.

In the left drawing of FIG. 14, facsimile outputs F are ejected onto the 1st and 2nd bins, and printer outputs P are ejected onto the 10th bin. The right drawing of FIG. 14 shows a state as a result of a copy operation in the sort mode from the state shown in the left drawing. In this case, copy outputs C can be output onto the 2nd to 9th bins. However, since the "leave out one bin" function is set in the ON state, bins available in this state are five bins, i.e., the 4th to 8th bins. At the beginning of the copy operation, the number of available bins is calculated, and when the copy user sets six or more sets of copies in the sort mode, a message indicating that the number of sets of copies is limited to five is displayed. On the other hand, if the document feeder 101 has a document circulation function, a so-called limit-less sort operation having five sets of copies as one unit is performed, thus allowing copying operations up to the maximum number of sets of copies that can be originally set by the machine.

As described above, since the bins of the ejected paper processing apparatus are assigned in units of functions, and one bin after the last bin for each function is not used, the user can easily distinguish the outputs of the respective functions from each other, and can be prevented from erroneously recovering outputs of another function. Since bins which are not used by the facsimile unit and the printer unit are detected, and the assignment of bins that can be used in the copy function is automatically changed, copy operations can be performed using the maximum number of bins available at that time. Furthermore, when the number of sets of copies exceeds the number of bins assigned to the copy function, limit-less sorting can be performed within the range of assigned bins. For this reason, users experience no limitations as to the copy operation, thus greatly improving the operability.

Third Embodiment

Figure 15:
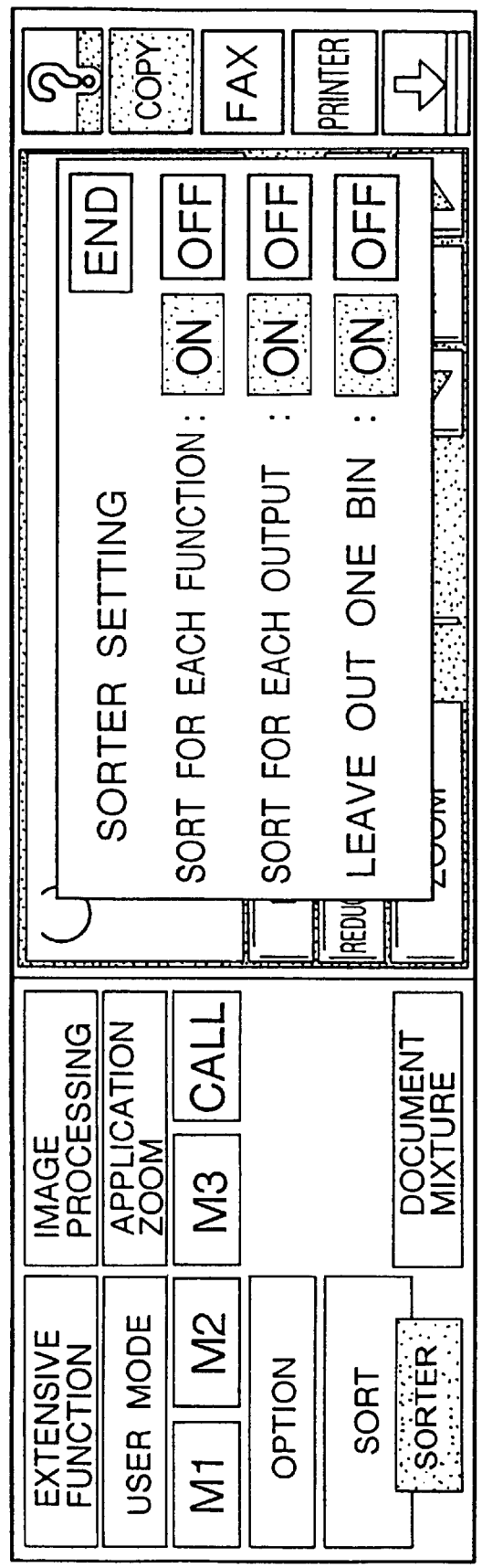
FIG. 15 is a plan view showing the setting screen of an ejected paper processing apparatus according to the third embodiment of the present invention.

FIG. 15 shows the setting screen of the ejected paper processing apparatus 220 according to the third embodiment of the present invention. The arrangements other than that shown in FIG. 15 are the same as those in the first embodiment, and a detailed description thereof will be omitted.

Referring to FIG. 15, an item "sort for each function" indicates a function of assigning output bins in units of functions, i.e., facsimile, printer, and copy functions. In this state, this function is set in the ON state. On the other hand, an item "sort for each output" indicates a function of, e.g., selectively using bins to which facsimile outputs are to be output in units of receptions or selectively using bins to which printer outputs are to be output in units of jobs. In this state, this function is set in the ON state. An item "leave out one bin" has already been described in the first embodiment, and a detailed description thereof will be omitted. In this state, this function is set in the ON state.

In this embodiment as well, the setting state of the bins is temporarily and automatically changed, so that the copy outputs use bins for other functions as well as long as such bins are available. After copied sheets are removed, the original setting state is resumed.

FIG. 16 illustrates the actual output state of the ejected paper processing apparatus 220 in the above-mentioned setting state.

The left drawing of FIG. 16 illustrates a state wherein facsimile outputs $F_1$ are ejected onto the 1st bin. After facsimile data are received in this state, one bin is left out, and facsimile outputs $F_2$ are ejected onto the 3rd bin. Thereafter, when the printer unit performs sort processing of three sets of sort printer outputs, printer outputs $P_1$ are ejected onto the 5th to 7th bins. Furthermore, when the printer unit performs a print operation of one set of printer outputs, the outputs $P_2$ are ejected onto the 9th bin. The right drawing of FIG. 17 shows this state.

Furthermore, the left drawing of FIG. 17 shows a state wherein the outputs are removed except for the printer outputs $P_2$ on the 9th bin from the state in the right drawing of FIG. 16. The right drawing of FIG. 17 shows the result of a copy operation in the sort mode from the state shown in the left drawing. In this case, copy outputs can be output onto the 1st to 8th bins. However, since the "leave out one bin" function is set in the ON state, bins which are available at that time are seven bins, i.e., the 1st to 7th bins. At the beginning of the copy operation, the number of available bins is calculated, and when the copy user sets eight or more sets of copies in the sort mode, a message indicating that the number of sets of copies is limited to seven is displayed. On the other hand, if the document feeder 101 has a document circulation function, limit-less sorting having seven sets of copies as one unit is performed, thus allowing copying operations up to the maximum number of sets of copies that can be originally set by the machine.

As described above, since the bins of the ejected paper processing apparatus are assigned in units of functions, and one bin after the last bin for each function is not used, the user can easily distinguish the outputs of the respective functions from each other, and can be prevented from erroneously taking outputs of one function for those of another. Since bins which are not used are detected, and the assignment of bins that can be used is automatically changed, the respective function outputs can be ejected using the maximum number of bins available at that time. Furthermore, when the number of sets of copies exceeds the number of bins assigned to the copy function, limit-less sorting can be performed within the range of assigned bins. For this reason, users experience no limitations as to the copy operation, thus greatly improving the operability.

As described above, even when outputs of the respective functions are present at the same time like in an image forming apparatus having compound functions such as a facsimile function, printer function, copy function, and the like, and the output trays of a recording medium processing apparatus are set in units of outputs, output trays on which no recording media are output are detected, and the setting state of the output trays of the recording medium processing apparatus is changed on the basis of the detected contents. For this reason, the respective function outputs can be made using the maximum number of trays available at that time. Of course, since outputs can be sorted, the respective function outputs can be easily distinguished from each other. In addition, users experience no limitations as to functions, thus greatly improving the operability of the apparatus.

What is claimed is:

1. An image forming apparatus comprising:

image forming means for forming images on copy-mode sheets in a copy image-forming mode, in which the images are based on image data from said image forming apparatus, and for forming images on non-copy-mode sheets in a non-copy image-forming mode, in which the images are based on image data from an external apparatus;

a plurality of storage means, which are used for storing the copy-mode sheets and the non-copy-mode sheets;

setting means for setting at least one of said plurality of storage means as copy-mode storage means for normally storing the copy-mode sheets and for setting at least another one of said plurality of storage means as non-copy-mode storage means for normally storing the non-copy-mode sheets; and control means for controlling the storing of copy-mode sheets and non-copy-mode sheets into said copy-mode and non-copy mode storage means that are set by said setting means respectively, wherein said control means is capable of prohibiting non-copy-mode sheets from being stored in said copy-mode storage means regardless of the presence or absence of the sheets, and of permitting copy-mode sheets to be stored in said non-copy-mode storage means unless non-copy-mode sheets have already been stored therein.

2. An apparatus according to claim 1, further comprising reading means for reading an original image, wherein said image forming means forms an image read by said reading means in the copy image-forming mode.

3. An apparatus according to claim 1, further comprising reception means for facsimile-receiving an image, wherein the non-copy image-forming mode is a facsimile mode, and said image forming means forms an image from image data received by said reception means in the facsimile mode.

4. An apparatus according to claim 1, further comprising input means for inputting image data from a computer, wherein the non-copy image-forming mode is a printer mode, and said image forming means forms an image from image data input by said input means in the printer mode.

5. An apparatus according to claim 1,
wherein said plurality of storage means are bins of a sorter.

6. An apparatus according to claim 5,
wherein said control means stores a plurality of sets of copy-mode sheets in consecutive bins.

7. An apparatus according to claim 5,
wherein said control means leaves out one bin between the bin in which copy-mode sheets are stored and the bin in which non-copy-mode sheets are stored.

8. An apparatus according to claim 1, further comprising detection means for detecting empty states of said plurality of storage means,
wherein said control means permits the copy-mode sheets to be stored in said non-copy-mode storage means in the case where said detection means detects the empty states of said non-copy-mode storage means.

9. An image forming method for an image forming apparatus, said method comprising the steps of:
forming images on copy-modes sheets in a copy image-forming mode, in which the images are based on image data from the image forming apparatus, and for forming images on non-copy-mode sheets in a non-copy image-forming mode, in which the images are based on image data from an external apparatus;
storing the copy-mode sheets and the non-copy-mode sheets, using a plurality of storage means;
setting at least one of the plurality of storage means as copy-mode storage means for normally storing the copy-mode sheets and for setting at least another one of the plurality of storage means as non-copy-mode storage means for normally storing the non-copy-mode sheets; and
controlling the image forming apparatus to prohibit non-copy-mode sheets from being stored in the copy-mode storage means set in said setting step regardless of the presence or absence of the sheets, and to permit copy-mode sheets to be stored in the non-copy-mode storage means set in said setting step unless non-copy-mode sheets have already been stored therein.

10. A method according to claim 9, further comprising the step of reading an original image,
wherein the image forming step includes the step of forming an image read in the reading step in the copy image-forming mode.

11. A method according to claim 9, further comprising the step of receiving image data from a facsimile,
wherein the non-copy image-forming mode is a facsimile mode, and in the image forming step the image is formed on the non-copy-mode sheet from the image data received in the receiving step in the facsimile mode.

12. A method according to claim 9, further comprising the step of inputting image data from a computer,
wherein the non-copy image-forming mode is a printer mode, and in the image forming step the image formed on the non-copy-mode sheet is from the image data input in the inputting step in the printer mode.

13. A method according to claim 9,
wherein the plurality of storage means are bins of a sorter.

14. A method according to claim 13,
wherein the controlling step includes the step of storing a plurality of sets of copy-mode sheets in consecutive bins.

15. A method according to claim 13,
wherein the controlling step includes the step of leaving out one bin between the bin in which copy-mode sheets are stored and the bin in which non-copy-mode sheets are stored.

16. A method according to claim 9, further comprising a detection step of detecting empty states of the plurality of storage means,
wherein in said controlling step the copy-mode sheets are permitted to be stored in the non-copy-mode storage means in the case where the empty states of the non-copy-mode storage means are detected in said detection step.

17. A control method for an image forming apparatus which forms an image on a copy-mode sheet in a copy image-forming mode, in which the image is based on image data from the image forming apparatus, or forms an image on a non-copy-mode sheet in a non-copy image-forming mode, in which the image is based on image data from an external apparatus, discharges one of the copy-mode sheet and the non-copy-mode sheet to at least one of a plurality of storage means, said method comprising the steps of:
setting at least one of said plurality of storage means as copy-mode storage means for normally storing the copy-mode sheets and setting at least another one or said plurality of storage means as non-copy-mode storage means for normally storing the non-copy-mode sheets;
preventing discharge of the non-copy-mode sheet to the copy-mode storage means regardless of the presence or absence of the sheets;
permitting discharge of the copy-mode sheet mode to the non-copy-mode storage means; and
preventing discharge of the copy-mode sheet to the non-copy-mode storage means when a non-copy-mode sheet is present therein.

18. A method according to claim 17, further comprising the step of reading an original image,
wherein the image forming step includes the step of forming an image read in the reading step in the copy image-forming mode.

19. A method according to claim 17, further comprising the step of receiving image data from a facsimile,
wherein the non-copy image-forming mode is a facsimile mode, and in the image forming step the image is formed on the non-copy-mode sheet from the image data received in the receiving step in the facsimile mode.

20. A method according to claim 17, further comprising the step of inputting image data from a computer,
wherein the non-copy image-forming mode is a printer mode, and in the image forming step the image formed on the non-copy-mode sheet is from the image data input in the inputting step in the printer mode.

21. A method according to claim 17,
wherein the plurality of storage means are bins of a sorter.

22. A method according to claim 21,
wherein the controlling step includes the step of storing a plurality of sets of copy-mode sheets in consecutive bins.

23. A method according to claim 21,
wherein the controlling step includes the step of leaving out one bin between the bin in which a copy-mode sheet is stored and the bin in which a non-copy-mode sheet is stored.

24. An image forming apparatus comprising:

an image forming unit for forming images on copy-mode sheets in a copy image-forming mode, in which the images are based on image data from said image forming apparatus, and for forming images on non-copy-mode sheets in a non-copy image-forming mode, in which the images are based on image data from an external apparatus;

a plurality of storage units, which are used for storing the copy-mode sheets and the non-copy-mode sheets;

a setting unit for setting at least one of said plurality of storage units as a copy-mode storage unit for normally storing the copy-mode sheets and for setting at least another one of said plurality of storage units as a non-copy-mode storage unit for normally storing the non-copy-mode sheets; and a controller for controlling the storing of the copy-mode sheets and the non-copy-mode sheets into said copy-mode and non-copy-mode storage units that are set by said setting unit respectively, wherein said controller is capable of prohibiting the non-copy-mode sheets from being stored in said copy-mode storage unit regardless of the presence or absence of the sheets, and of permitting the copy-mode sheets to be stored in said non-copy-mode storage unit unless the non-copy-mode sheets have already been stored therein.

25. An apparatus according to claim 24, wherein said plurality of storage units are bins of a sorter.

26. An apparatus according to claim 25, wherein said controller stores a plurality of sets of the copy-mode sheets in consecutive bins.

27. An apparatus according to claim 25, wherein said controller leaves one bin between the bin in which the copy-mode sheets are stored and the bin in which the non-copy-mode sheets are stored.

28. An apparatus according to claim 24, further comprising a setting unit for setting said copy-mode and non-copy-mode storage units, wherein said controller controls the storing of the copy-mode sheets and the non-copy-mode sheets into said copy-mode and non-copy-mode storage units that are set by said setting unit.

29. An image forming method comprising:

an image forming step, of forming images on copy-mode sheets in a copy image-forming mode, in which the images are based on image data from as image forming apparatus, and of forming images on non-copy-mode sheets in a non-copy image-forming mode, in which the images are based on image data from an external apparatus;

a storage step, of storing copy-mode sheets and non-copy-mode sheets, using a plurality of storage units;

a setting step, of setting at least one of said plurality of storage units as a copy-mode storage unit for normally storing the copy-mode sheets and of setting at least another one of said plurality of storage units as a non-copy-mode storage unit for normally storing the non-copy-mode sheets; and a control step, for controlling the storing of the copy-mode sheets and the non-copy-mode sheets in said copy-mode and non-copy-mode storage units that are set in said setting step respectively, wherein said control step is capable of prohibiting the non-copy-mode sheets from being stored in said copy-mode storage unit regardless of the presence or absence of the sheets, and of permitting the copy-mode sheets to be stored in said non-copy-mode storage unit unless the non-copy-mode sheets have already been stored.

30. A method according to claim 29, wherein said plurality of storage units are bins of a sorter.

31. A method according to claim 30, wherein in said control step a plurality of sets of the copy-mode sheets are stored in consecutive bins.

32. A method according to claim 30, wherein in said control step one bin is left out between the bin in which the copy-mode sheets are stored and the bin in which the non-copy-mode sheets are stored.

33. A method according to claim 29, further comprising a setting step, of setting said copy-mode and non-copy-mode storage steps, wherein in said control step it is controlled to perform the storing of the copy-mode sheets and the non-copy-mode sheets into said copy-mode and non-copy-mode storage steps that are set by said setting step.

* * * * *

UNITED STATES PATENT AND TRADEMARK OFFICE
CERTIFICATE OF CORRECTION

PATENT NO. : 6,636,323 B2  Page 1 of 1
DATED : October 21, 2003
INVENTOR(S) : Yoshihiko Suzuki et al.

It is certified that error appears in the above-identified patent and that said Letters Patent is hereby corrected as shown below:

<u>Column 8,</u>
Line 42, "non-copy mode" should read -- non-copy-mode --.

<u>Column 9,</u>
Line 21, "copy-modes" should read -- copy-mode --.

<u>Column 10,</u>
Line 33, "copy-mode sheet mode" should read -- copy-mode sheet --.

<u>Column 12,</u>
Line 4, "as" should read -- an --; and
Line 12, "for" should read -- of --.

Signed and Sealed this

Thirteenth Day of April, 2004

JON W. DUDAS
*Acting Director of the United States Patent and Trademark Office*